April 10, 1956 — R. M. CUMMINS — 2,741,103

MOLD FOR FREEZING LIQUIDS

Filed June 11, 1954

INVENTOR.
Roy M. Cummins

BY
McMorrow, Berman + Davidson
ATTORNEYS

United States Patent Office 2,741,103
Patented Apr. 10, 1956

2,741,103

MOLD FOR FREEZING LIQUIDS

Roy M. Cummins, Akron, Ohio

Application June 11, 1954, Serial No. 436,173

1 Claim. (Cl. 62—108.5)

This invention relates to an improved ice freezing tray.

Another object is to facilitate the production of frozen objects of cylindrical formation capable of being inserted in the necks of vacuum bottles and to avoid the necessity of filling each mold cavity individually.

Still another object is to provide an ice freezing tray adapted to be filled with the liquid to be frozen and a removable mold insertible into said tray which will expel from the tray excess liquid by the simple insertion of the mold into the tray.

The above and other objects may be attained by employing this invention which embodies among its features a tray for receiving a liquid to be frozen; said tray having a bottom, side and end walls extending upwardly therefrom; a mold removably inserted in the tray and resting on the bottom thereof; said mold having spaced openings extending therethrough; and the mold having walls extending upwardly therefrom in registration with the walls of the openings to define with the bottom of the tray spaced liquid receiving and confining mold cavities.

Other features include side and end walls on the grid extending upwardly therefrom adjacent the side and end walls of the tray, ears carried by the end walls of the mold and extending longitudinally outwardly therefrom above the end walls of the tray to define handles on the mold, said ears having slots extending therethrough adjacent their junctions with the end walls of the grid, tongues carried by the end walls of the tray and extending upwardly therefrom through the slots, and lugs carried by the tongues and projecting outwardly therefrom above the ears for frictionally engaging the walls of the slots and holding the bottom of the mold against the bottom of the tray.

Figure 1:
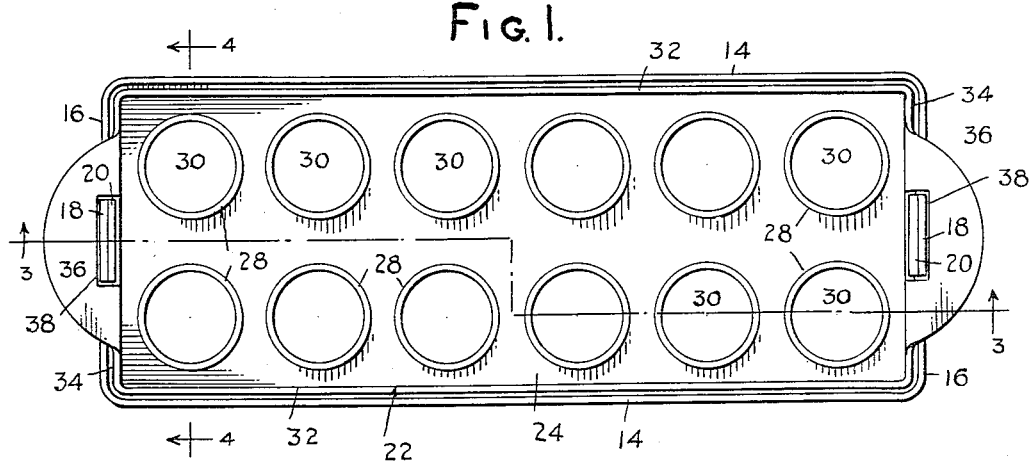
Figure 1 is a top plan view of a freezing tray embodying the features of this invention.
Figure 2:
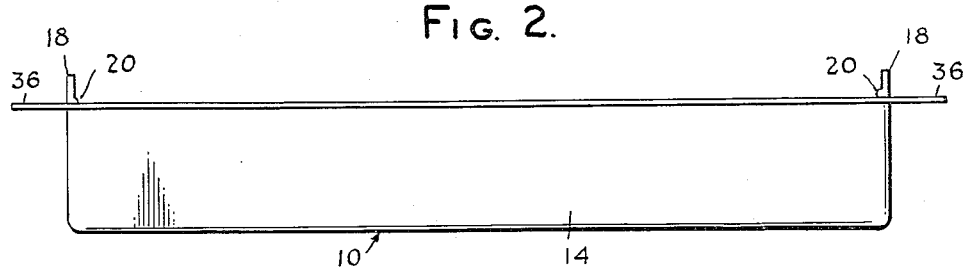
Figure 2 is a side view thereof.
Figure 3:
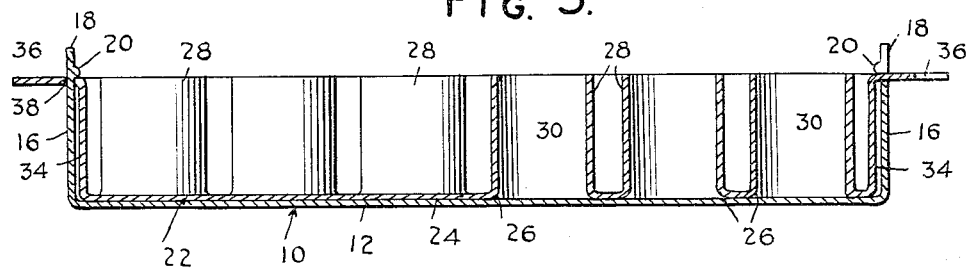
Figure 3 is a sectional view taken substantially on the line 3—3 of Figure 1.
Figure 4:
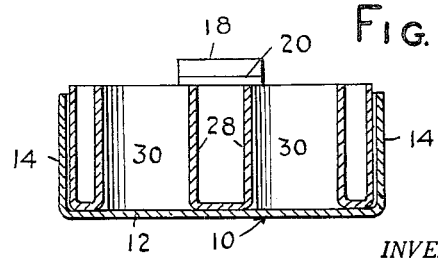
Figure 4 is a transverse sectional view taken substantially on the line 4—4 of Figure 1.

Referring to the drawings in detail, the illustrated device comprises a tray section generally 10 which is provided with a flat bottom 12 carrying upwardly extending side walls 14 and end walls 16. Located intermediate the ends of the end walls 16 and extending upwardly therefrom above the top of the tray sections 10 are tongues 18 carrying adjacent the upper edges of the end walls 16 inwardly extending lugs 20, the purpose of which will hereinafter appear.

A mold section designated generally 22, normally seated in the tray section 10, comprises a bottom 24 having spaced openings 26 extending therethrough and extending upwardly therefrom in registration with the openings 26 are walls 28 which define with the bottom 12 of the tray section 10 mold cavities 30 in which the liquid to be frozen is confined.

Carried by the bottom 24 of the mold section and extending upwardly therefrom along opposite side edges thereof are side walls 32 which, when the mold section 22 is in place in the tray section 10, lie adjacent the tray section side walls 14, and extending upwardly from the bottom 24 adjacent opposite ends thereof are end walls 34 which lie adjacent the end walls 16 of the tray section when the mold section is in place in the tray section 10. Carried by the end walls 34 of the mold section 22 and extending longitudinally therefrom across the top edges of the end walls 16 of the tray section 10 are ears 36 having slots 38 extending therethrough for receiving the tongues 18 and lugs 20 previously described. It will thus be seen that with the mold section 22 in place in the tray section 10, the lugs carried by the tongues 18 will partially overlie the adjacent end walls 34 of the mold section 22 so as to retain the mold section in place in the tray section 10 and prevent its floating under the influence of water in the tray section. The tongues, of course, are resilient so that when it is desired to remove the mold section from the tray section, the tongues may be sprung to enable the lugs 20 to clear the end walls 34 of the mold section and permit the ears 36 to act as handles for removing the mold section 22 from the tray section 10.

In use, it will be evident that water may be run into the tray section 10 to fill the same after which the mold section 22 may be introduced into the tray section and being pressed downwardly will expel the water contained in the tray section in excess of that which enters the mold cavities 30. Upon pressing the mold section home, the tongues 18 will pass through the slots 38 and the lugs in passing through the slots 38 will engage the upper edges of the end walls 34 of the mold section 22 to hold the mold section downwardly in the tray section 10 and prevent its floating out of place. After the liquid in the mold cavities 30 has been frozen, the mold section may be removed from the tray section by exerting pressure on the tongues 18 to enable the lugs 20 to pass through the slots 38 so that the mold section may be lifted out of the tray section 10, and the molded ice may be removed from the cavities 30 in any conventional manner.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

In a freezing tray, a tray section comprising a flat bottom, side walls, and end walls, said end walls having upper edges, resilient tongues on and rising above the upper edges of the end walls at points intermediate the ends of said upper edges, a mold section removably seated within said tray section, said mold section having a bottom resting upon the tray section bottom and side walls and end walls engaging the side walls and end walls of the tray section, the mold section end walls having upper edges, laterally projecting ears on the upper edges of the mold section end walls overlying the upper edges of the tray section end walls, said ears having slots passing said tongues, said tongues having laterally inward sides, and lugs on and projecting laterally inwardly from the laterally inward sides of the tongues and retainably overlying the upper edges of the mold section end walls, and open top mold chambers on the mold section comprising walls rising from the mold section bottom and having free upper edges.

References Cited in the file of this patent

UNITED STATES PATENTS

| 969,079 | Ricker | Aug. 30, 1910 |
| 1,605,215 | Carr | Nov. 2, 1926 |
| 2,260,570 | John | Oct. 28, 1941 |
| 2,411,193 | Cummins | Nov. 19, 1946 |
| 2,665,353 | Popp | Jan. 5, 1954 |